United States Patent [19]
Zuckerberg et al.

[11] 3,966,407
[45] June 29, 1976

[54] AIR STERILIZING COMPRESSOR SYSTEM
[76] Inventors: Harry Zuckerberg, 60 Browne St.;
William Kukers, 86 Griggs Road,
both of Brookline, Mass. 02146
[22] Filed: Aug. 2, 1974
[21] Appl. No.: 494,168

[52] U.S. Cl. .................................. 21/74 R; 21/53;
21/92; 98/33 R; 98/33 A
[51] Int. Cl.² .................... A61L 3/00; F24F 13/00
[58] Field of Search ...................... 21/74 R, 53, 92;
98/2.05–2.09, 33 A, 33 R; 55/472; 62/33,
402

[56] References Cited
UNITED STATES PATENTS

| | | | |
|---|---|---|---|
| 3,158,457 | 2/1964 | Whitfield | 55/472 |
| 3,222,883 | 12/1965 | Glaspie | 62/402 |
| 3,239,305 | 3/1966 | Potapenko | 21/53 |
| 3,261,659 | 7/1966 | Schwichtenberg et al. | 21/74 R |
| 3,587,243 | 6/1971 | Keller | 62/402 |
| 3,721,067 | 3/1973 | Agnew | 21/53 |

Primary Examiner—Morris O. Wolk
Assistant Examiner—Dale Lovercheck

[57] ABSTRACT

A system for providing a large volume flow of sterilized air through a serviced medical service facility for significantly reducing sources of airborne contamination in the facility comprises a closed circulation loop connected between an output plenum of the medical service facility and an input plenum of the medical service facility. A compressor in the closed collection loop imparts flow energy to the air circulating in the closed circulation loop and simultaneously raises the temperature of that air. The compressed, heated air is maintained at sterilizing temperature for a sufficient time to achieve substantially complete sterilization and then flowed to the medical service facility.

16 Claims, 1 Drawing Figure

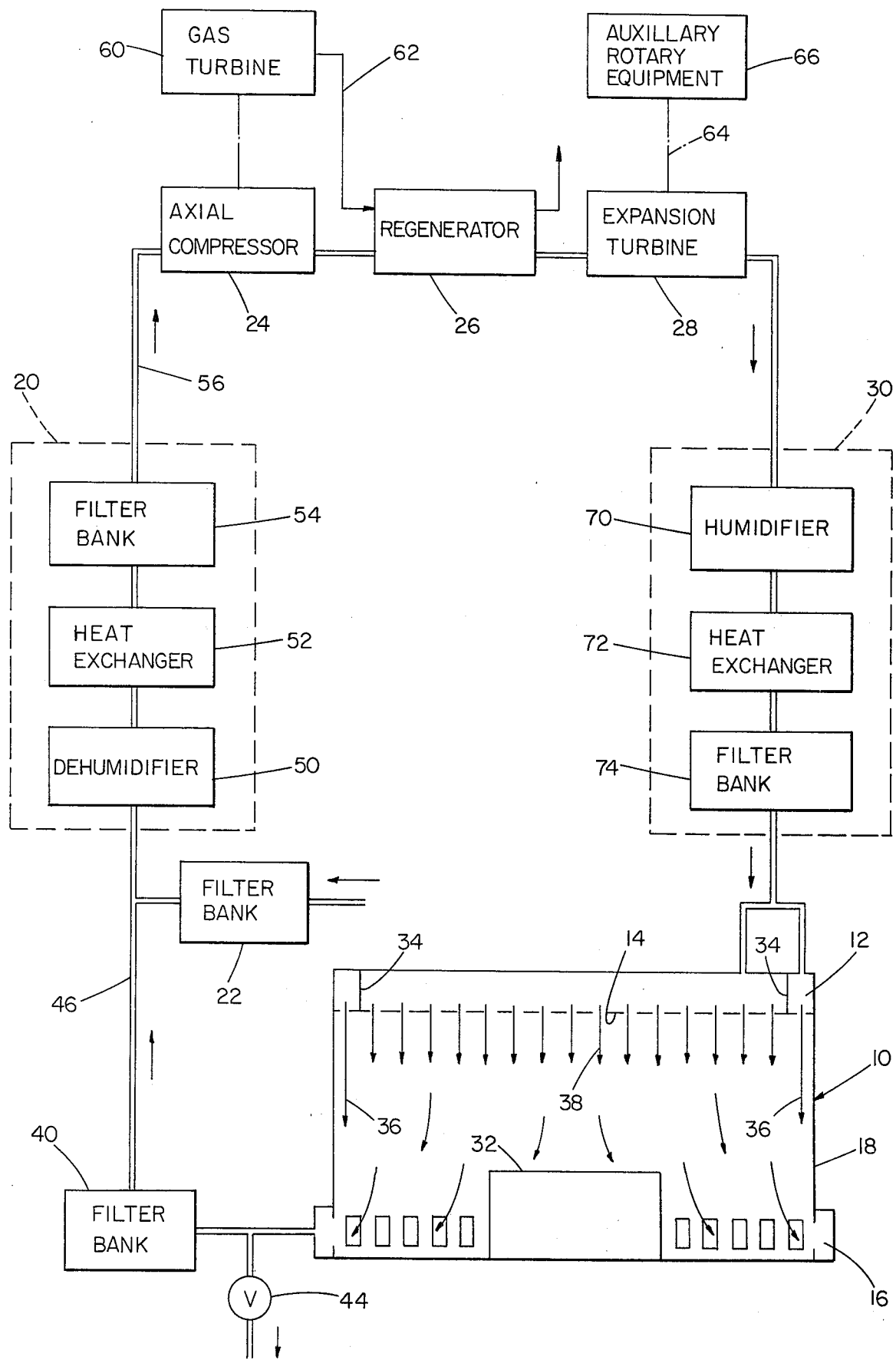

3,966,407

AIR STERILIZING COMPRESSOR SYSTEM

SUMMARY OF INVENTION

This application relates to air treatment systems and more particularly to systems for reducing sources of infection in large area medical service facilities such as hospital operating rooms, intensive care facilities, pharmaceutical laboratories, virus laboratories and the like.

Considerable attention has been accorded to efforts in reducing sources of infection and contamination in medical facilities. In recent years the need for sterile environments in hospitals has become increasingly acute, due in part to the increased resistance of microorganisms to antibiotics and in part to increased use of sophisticated surgical techniques, such as open heart surgery and major orthopedic surgery. For example, a total hip replacement operation is particularly susceptible to surgically induced infection due in part to the introduction into the patient's body of significant amounts of foreign (artificial) materials, the exposure of large areas of wound tissue to the atmosphere for considerable periods of time, and the advanced age of many of the patients. Great care is normally taken, for example, in the sterilization of instruments and equipment, in the cleanliness of wearing apparel, and in the use of surgical masks. Further, numerous restrictions may be imposed on personnel, inhibiting or impeding their activities within the medical service facility. In an effort to reduce infection in such facilities, clean room technology utilizing unidirectional airflow systems have been proposed for reducing airborne and surface micro organism contamination. Examples of a number of such systems are described in U.S. Pat. No. 3,721,067. Such systems have endeavored to reduce sources of contamination and infection by providing unidirectional airflow patterns, either alone or in combination with passage of air through sterilization chambers where the air is exposed to germicidal radiation for example. However, a number of sources of infections, such as viruses, are not effectively removed in such systems. Further, such systems are of limited effectiveness and/or practicality in many types of medical service facilities in which micro-organisms are a serious source of contamination or infection.

It is an object of this invention to provide a novel and improved air treatment system for reducing sources of infection in a large area medical service facility such as an operating room.

Another object of the invention is to provide a novel and improved large capacity air circulation system which provides economical purification and sterilization of air for use in a medical service facility.

In accordance with the invention there is provided an air processing system that has a flow capacity to provide at least two hundred changes per hour of the air in the serviced operating room or other similar medical service facility. Connected in a closed path to the inlet plenum of the medical service facility is a compressor which imparts flow energy to the air in the closed path and simultaneously raises the temperature of the air at least 300°F. The compressed air is flowed into an air temperature retaining unit which incorporates an air passageway arrangement for maintaining the heated air at sterilizing temperature for a sufficient time interval for achieving substantially complete sterilization. In a particular embodiment this air temperature retaining unit may include supplemental heat input to raise the temperature of the air to sterilizing temperature. In other embodiments compression alone heats the air to the sterilizing temperature. Connected between the air temperature retaining unit and the input plenum of the medical service facility is an expansion device through which the sterilized air is passed to reduce its temperature, the expansion device in a particular embodiment being rotary apparatus with rotary energy extracted as a result of the expansion being used for auxiliary drive purposes. The cooled air is then subjected to further conditioning as desired, for example humidification and particulate filtering, and then flowed through the medical service facility. This air flow is on a continuing basis so that the facility is continuously flushed with sterilized air. The air flow through the facility flushes airborne micro-organisms and other contamination from the facility and thus provides on a continuing basis an environment of enhanced cleanliness.

In a particular embodiment, the air processing system for a medical service facility of four thousand cubic feet volume includes a closed circulation loop of 20,000 cubic feet per minute rated capacity which includes a pretreatment system that receives air exhausted from the medical service facility and also makup air from the external environment. In the particular embodiment a post-treatment system is included between the expansion system and the medical service facility for conditioning the sterilized air flow. The pretreatment system includes a dehumidifier, the purpose of which is to insure that the humidity of the air reaching the compressor stage is less than approximately twenty percent relative; a heat exchanger for stabilizing the temperature of the air independent of the external environment temperature; and a filter bank for removing particulate matter from the airstream. The compressor system includes an axial flow compressor which is driven by a gas turbine and produces a flow rate in the order of twenty thousand cubic feet per minute while contemporaneously raising the temperature of the airstream in excess of 350°F. Connected in the closed circulation path between the compressor system and the expansion system is a regenerator which functions as the retaining unit and into which exhaust gas from the turbine is supplied to further increase the temperature of the airstream to sterilizing temperature (in the order of about 700°F in this embodiment). The regenerator configuration includes an extended air flow path and retains the compressed heated air for sufficient time to provide substantially complete sterilization (substantially all micro-organism life being destroyed). The compressed sterilized air then flows through a rotary expansion device for cooling, the involved expansion producing rotary driving power which may be utilized as auxiliary power for the medical service facility or other purposes. The post-treatment system includes a humidifier for entraining moisture in the airstream, a suitable humidity value typically being about 50% relative; and a high efficiency particulate air (HEPA) filter which removes particulate matter of submicron dimension from the airstream. The airstream from the post-treatment system continuously flows into the input plenum in the ceiling of the medical service facility, from the input plenum downwardly at a velocity in the range of fifty to three hundred feet per minute through that facility (a velocity gradient preferably being provided so that higher velocity exists at the walls than in the interior of the room), and is exhausted through an output plenum which surrounds the walls of service facility adjacent the floor. The particulate embodiment also includes a filter system disposed in the closed loop between the service facility and the pretreatment system and a suitable control valve arrangement for balancing the air flow through the closed loop system and the medical service facility.

The invention provides a system that efficiently provides in an economically feasible manner a large volume flow of sterilized air through a large area medical service facility for significantly reducing sources of airborne infection while permitting increased freedom of personnel ingress and egress to and from the facility and flexibility of personnel movement and instrument and support apparatus positioned within the facility. Other objects, features and advantages of the invention will be seen as the following description of a particulate embodiment progresses, in conjunction with the drawing, which shows in schematic diagram form an embodiment of the invention.

DESCRIPTION OF PARTICULATE EMBODIMENT

With reference to the drawing, a medical service facility, which may be an operating theater, a nursery or an intensive care unit, for example, is indicated at 10. This facility 10 has a volume of about four thousand cubic feet with an input plenum 12 about its ceiling 14, and an output plenum 16 surrounding the facility at the base of its peripheral wall 18 through which airflow is exhausted. Disposed in facility 10 are suitable instrumentation and service facilities which for simplicity is diagrammatically indicated as an operating table 32.

The medical service facility is connected in a closed flow loop path that includes a pretreatment system 20 that has an input from an external supply of air through a grill or other suitable input baffle and filter arrangement 22; an axial flow compressor 24; a regenerator 26; a rotary expansion turbine stage 28; and a post-treatment system 30. All the air from the pretreatment system 20 is flowed through compressor 24, sterilizing regenerator 26, expander 28, and post-treatment system 30 for flow into input plenum 12. The sterilized airstream flows downwardly from plenum 12 through the facility 10 over substantially its entire cross-sectional area. The plenum 12 is configured as by separator 34 to discharge air at a velocity of about two hundred feet per minute in a curtain along the entire wall 18 as indicated by arrows 36 and at a lower velocity at the center of the room as indicated by arrows 38. A transition velocity gradient may be provided adjacent curtain 36. A relatively large body of air thus is continuously supplied for flow at low velocity through the room, room without stagnant pockets. This flow of air is exhausted through outlet plenum 14 and carried with it airborne micro-organisms and other particulate contamination from the room in a continuous flushing operation. The output plenum 14 is connected through flow path 40 to filter system 42 which removes particulate matter that may have been entrained in the airstream as it flows through the facility 10. Suitable valves as indicated at 44, for example, are provided in the air closed loop flow path for adjusting the flow of air through the loop system and providing the desired balanced flow of air through the connected medical service facility. Air from the airstream from filter bank 42 is returned to pretreatment system 20 via line 46.

Pretreatment section 20 includes a dehumidifier 50 which removes water vapor from the air; a heat exchanger 52 for stabilizing the temperature of the air independently of the temperature of the air applied to the system through inlet 22; and a filter bank 54 which functions to remove particulate material from the airstream. Filter bank 22 includes inertia separator mechanisms such as the Donaldson Strata Panel Separator and a high efficiency barrier type filter, which filter bank 54 includes a second high efficiency barrier type filter. One or more filters of type as suitable for the particulate application and environment in which the system may be used in each bank. The output air on line 56 is supplied at about atmospheric pressure, a temperature of about 60°F and a relative humidity of about 10% for application to axial flow compressor 24.

In this particular embodiment the axial flow compressor 24 is driven by gas turbine 60, the gas turbine air compressor system being a Curtis Wright Type CW657E50 unit which provides a compressor air flow of about 20,000 cubic feet per minute and an increase in the air temperature of about 360°F. The compressed air is supplied to regenerator chamber 26 for flow through an elongated passage and exhaust gas from turbine 60 is supplied over line 62 to regenerator chamber 26 for flow over and around the passages through which the compressed air is flowing. The temperature of the compressed air in chamber 26 is raised to about 700°F and maintained at that temperature for a period of time sufficient to achieve substantially complete sterilization. With higher temperature systems the retention duration is shorter. The compressed sterilized air then flows from regenerator 26 into expansion stage 28 which is an expansion turbine stage mounted on shaft 64 for expansion and cooling. The energy released as the air expands and cools is applied to output shaft 64 for driving auxiliary rotary equipment diagrammatically indicated at 66.

The cooled sterilized air is then applied to posttreatment system 30 which includes humidifier 70 for increasing the moisture content of the air; a heat exchanger 72 for further moderating the temperature of the air if required, and a high efficiency particulate air (HEPA) filter 74 for removing submicron particulate material from the airstream.

The air flow from the post-treatment system is sterilized and free of particulate matter and supplied at a suitable temperature, for example 75°±1°F and a relative humidity of 50±5% for flow into input plenum 12.

Thus the system in accordance with the invention provides a continuous flow of sterilized air through a medical service facility in an arrangement in which sources of infection are significantly reduced in a dynamic system and on a continuing basis. The invention enables greater freedom and facility of use of the medical service facility while maintaining a high degree of cleanliness. While a particular embodiment of the invention has been shown and described, various modifications will be apparent to those skilled in the art and therefore it is not intended that the invention be limited to the disclosed embodiment or to details thereof and departures may be made therefrom within the spirit and scope of the invention as defined in the claims.

What is claimed is:

1. An air processing system for use with a medical service facility that has an inlet passage for flow of air into the facility and an outlet pressure for flow of air out of the facility, said air processing system having a flow capacity sufficient to provide at least two hundred changes of air per hour in the serviced medical service facility and comprising closed path structure having an inlet port for connection to the outlet passage of the serviced medical service facility and an outlet port for connection to the inlet passage of the serviced medical facility, said closed path structure defining a closed air flow path between said inlet port and said outlet port, a compressor in said closed path, said compressor imparting flow energy to the air in said closed path and simultaneously raising the temperature of the air in said closed path at least 300°F, said compressor having an inlet connected to said inlet port and an outlet through which heated air flows from said compressor, an air temperature retaining unit in said closed path, said air temperature retaining unit having an inlet connected directly to the outlet of said compressor, an air passageway arrangement for maintaining the heated air from said compressor at sterilizing temperature for a sufficient time interval for achieving substantially complete sterilization, and an outlet through which sterilized air flows from said air temperature retaining unit, and an expansion device in said closed path, said expansion device having an inlet through which the sterilized air from said air temperature retaining unit is passed and an outlet connected to said outlet port, said expansion device reducing the temperature of the sterilized air from said air temperature retaining unit prior to flow of that air through said closed path outlet port for flow into the serviced medical service facility.

2. The system as claimed in claim 1 wherein said compressor is an axial flow device that is capable of producing an air flow of at least ten thousand cubic feet per minute along said closed path.

3. The system as claimed in claim 1 wherein said compressor is driven by a gas turbine and said air temperature retaining unit includes supplemental heat input from said turbine to raise the temperature of the air to sterilizing temperature.

4. The system as claimed in claim 1 wherein said closed circulation loop path further includes a pretreatment system connected between said inlet port and said compressor, and a post-treatment system connected between said expansion device and said outlet port for conditioning said sterilized air.

5. The system as claimed in claim 4 wherein said pretreatment system includes dehumidifier means to reduce the humidity of the air reaching said compressor stage to less than approximately twenty percent relative; heat exchanger means for stabilizing the temperature of the air independent of the external environment temperature; and a filter bank for removing particulate matter from the airstream.

6. The system as claimed in claim 4 wherein said posttreatment system includes humidifier means for entraining moisture in the airstream, and a high efficiency particulate air (HEPA) filter for removing particulate matter of submicron dimension from the airstream immediately prior to flow through the serviced medical service facility.

7. The system as claimed in claim 4 and further including a filter system disposed in said closed path between said service facility and said pretreatment system and a control valve for adjusting the air flow through said closed path system.

8. A system for providing a large volume flow of sterilized air through a serviced medical service facility for significantly reducing sources of airborne contamination in the facility comprising in combination, a medical service facility having an input plenum and an output plenum, a closed circulation loop connected between said output plenum and said input plenum, a compressor in said closed circulation loop and having an inlet connected to receive air from said output plenum of said medical service facility for imparting flow energy to the air circulating in said closed circulation loop and simultaneously compressing the air to raise the temperature of the air at least 300°F, said compressor having an inlet connected to receive air from said output plenum of said medical service facility and an outlet through which heated air flows from the compressor, an air temperature retaining unit in said closed circulation loop connected directly to said compressor outlet, said air temperature retaining unit incorporating an air passageway arrangement for maintaining the heated air from said compressor at sterilizing temperature for a sufficient time interval for achieving substantially complete sterilization, and having an outlet through which sterilized air flows from said air temperature retaining unit, and an expansion device in said closed circulation loop connected to said air temperature retaining unit outlet, said expansion device reducing the temperature of the sterilized air from said air temperature retaining unit and having an outlet through which the sterilized air of reduced temperature flows into said input plenum of said medical service facility.

9. The system as claimed in claim 8 wherein said input plenum is in the ceiling of said facility and air is discharged downwardly at a velocity in the range of fifty to three hundred feet per minute for flow through said medical service facility.

10. The system as claimed in claim 8 wherein said input plenum is the the ceiling of said medical service facility and includes flow control means for discharging air downwardly in a curtain along the entire peripheral wall of the facility at a velocity at least about twice the velocity of air discharged downwardly from an interior point of said input plenum, and said output plenum extends around the periphery of said facility adjacent its floor.

11. The system as claimed in claim 10 wherein said compressor is capable of producing an air flow of at least ten thousand cubic feet per minute along said closed circulation loop.

12. The system as claimed in claim 11 wherein said compressor is an axial flow device and said expansion device is a rotary driven device.

13. The system as claimed in claim 12 wherein said compressor is driven by a gas turbine and said air temperature retaining unit includes supplemental heat input from said turbine to raise the temperature of the air to sterilizing temperature.

14. The system as claimed in claim 13 wherein said circulation loop further includes a pretreatment system that receives air exhausted from the output plenum of said medical service facility and also makeup air from an external environment, and a post-treatment system between said expansion device and the input plenum of said medical service facility for conditioning the sterilized air.

15. The system as claimed in claim 14 wherein said pretreatment system includes dehumidifier means to reduce the humidity of the air reaching said compressor stage to less than approximately twenty percent relative; heat exchanger means for stabilizing the temperature of the air independent of the external environment temperature; and a filter bank for removing particulate matter from the airstream; and said post-treatment system includes humidifier means for entraining moisture in the airstream, and high efficiency particulate air (HEPA) filter means for removing particulate matter of submicron dimension from the airstream immediately prior to flow through the serviced medical service facility.

16. A method for providing a large volume flow of sterilized air through a serviced medical service facility for significantly reducing sources of airborne contamination in the facility comprising the steps of providing a closed circulation loop connected between an output plenum of the medical service facility and an input plenum of the medical service facility, circulating air through said closed circulation loop and said medical service facility at a rate sufficient to provide at least two hundred changes per hour of air in said medical service facility, compressing all the air circulating in said closed circulation loop to impart flow energy to the air, said compressing action simultaneously raising the temperature of that air at least 300°F, maintaining the compressed heated air at sterilizing temperature for a sufficient time interval for achieving substantially complete sterilization, expanding the sterilized compressed air to reduce its temperature prior to flow into said medical service facility, and applying air flowing from the output plenum of the medical service facility to said closed circulation loop for recompression and resterilization.

\* \* \* \* \*

UNITED STATES PATENT OFFICE
CERTIFICATE OF CORRECTION

Patent No. 3,966,407          Dated June 29, 1976

Inventor(s) William Kukers et al.

It is certified that error appears in the above-identified patent and that said Letters Patent are hereby corrected as shown below:

On the Title Page, Item [76] the inventors should be listed in alphabetical order.

Column 3, line 17, "particulate" should read --particular--.
         line 22, "PARTICULATE" should read --PARTICULAR--.
Column 4, line 7, "which" should read ---while--.
         line 10, "particulate" should read --particular--.
         line 65, "pressure" should read --passage--.

Signed and Sealed this

Fourteenth Day of September 1976

[SEAL]

Attest:

RUTH C. MASON
Attesting Officer

C. MARSHALL DANN
Commissioner of Patents and Trademarks